United States Patent
Drosihn

(10) Patent No.: US 9,003,567 B2
(45) Date of Patent: Apr. 14, 2015

(54) HAND COVERING WITH TACTILITY FEATURES

(75) Inventor: Lonnie Drosihn, Monkton, MD (US)

(73) Assignee: 180s, Inc., Baltimore, MD (US)

( * ) Notice: Subject to any disclaimer, the term of this patent is extended or adjusted under 35 U.S.C. 154(b) by 951 days.

(21) Appl. No.: 12/330,738

(22) Filed: Dec. 9, 2008

(65) Prior Publication Data

US 2009/0183297 A1  Jul. 23, 2009

Related U.S. Application Data

(60) Provisional application No. 61/012,442, filed on Dec. 9, 2007.

(51) Int. Cl.
*A41D 19/00* (2006.01)
*G06F 3/033* (2013.01)
*A41D 31/00* (2006.01)

(52) U.S. Cl.
CPC .................................. *A41D 19/0024* (2013.01)

(58) Field of Classification Search
CPC ........... A41D 31/0038; A41D 19/0024; A41D 19/01; A41D 31/0016; A41D 13/1281; A41D 19/00; A41D 19/0013; A41D 19/015; A41D 19/0157; A41D 1/005; A41D 2500/10; A41D 31/00; A41D 31/0011; A41D 31/0066; D10B 2101/20; D10B 2401/18; D10B 2403/02431; D10B 2501/041; H01H 13/702; H01H 13/785; H01H 2203/0085; G06F 1/163; G06F 2203/0331; G06F 3/014; G06F 3/0202

USPC ............ 2/159, 160, 161.1, 161.6, 161.7, 163, 2/164, 167, 243.1, 247, 250, 272, 905

See application file for complete search history.

(56) References Cited

U.S. PATENT DOCUMENTS

| | | |
|---|---|---|
| 206,474 A | 7/1878 | Morel |
| 428,115 A | 5/1890 | Levy |
| 497,822 A | 5/1893 | Royer |
| 884,681 A | 4/1908 | Reed |
| 1,380,960 A | 6/1921 | Hmenia |
| 1,545,413 A | 7/1925 | Elmvall |
| 1,979,130 A | 10/1934 | Wiley |
| 2,261,072 A | 10/1941 | Monahan |
| 2,311,276 A | 2/1943 | Wilcox |
| D168,689 S | 1/1953 | Jones |

(Continued)

FOREIGN PATENT DOCUMENTS

| | | |
|---|---|---|
| CA | 2534160 A1 | 7/2007 |
| CN | 2909876 Y | 6/2007 |

(Continued)

OTHER PUBLICATIONS iTWYF product slides from www.itwyf.com (16 pages).

(Continued)

*Primary Examiner* — Bobby Muromoto, Jr.

(57) ABSTRACT

This invention relates generally to a hand covering. More specifically, the present invention relates to a hand covering with tactility features. The tactility features of the hand covering enable the wearer of the hand covering to have improved dexterity and tactility while wearing the hand covering and performing various tasks. In one embodiment, the hand covering includes a conductive member that can be used with an interface of an electronic device.

20 Claims, 18 Drawing Sheets

(56) References Cited

U.S. PATENT DOCUMENTS

| | | | |
|---|---|---|---|
| 2,895,139 A | 7/1959 | Compton | |
| 3,544,841 A | 12/1970 | Peel | |
| 3,845,771 A | 11/1974 | Vise | |
| 3,953,935 A | 5/1976 | Reiner et al. | |
| 4,016,868 A | 4/1977 | Allison | |
| 4,510,939 A | 4/1985 | Brenman et al. | |
| 4,589,146 A | 5/1986 | Taylor | |
| 4,613,139 A | 9/1986 | Robinson, II | |
| 4,654,748 A | 3/1987 | Rees | |
| 4,712,253 A | 12/1987 | Chen | |
| 4,723,324 A | 2/1988 | Lassiter | |
| 4,762,497 A | 8/1988 | Burvee | |
| 4,765,343 A | 8/1988 | Brenman et al. | |
| 4,779,290 A | 10/1988 | Welch et al. | |
| 4,964,174 A | 10/1990 | Martin | |
| 5,047,952 A | 9/1991 | Kramer et al. | |
| 5,070,862 A | 12/1991 | Berlant | |
| 5,390,371 A | 2/1995 | Sigward | |
| 5,488,362 A | 1/1996 | Ullman et al. | |
| 5,598,584 A | 2/1997 | Da Grossa | |
| 5,631,861 A | 5/1997 | Kramer | |
| 5,640,713 A | 6/1997 | Ping | |
| 5,687,424 A | 11/1997 | Masley | |
| 5,715,536 A | 2/1998 | Banks | |
| 5,829,061 A | 11/1998 | Visgil et al. | |
| 5,875,489 A | 3/1999 | Couto | |
| 6,029,276 A | 2/2000 | White | |
| 6,049,327 A | 4/2000 | Walker et al. | |
| 6,075,189 A | 6/2000 | Robb | |
| 6,104,379 A | 8/2000 | Petrich et al. | |
| 6,110,186 A | 8/2000 | Rizvi | |
| 6,126,373 A | 10/2000 | Yee et al. | |
| 6,128,004 A | 10/2000 | McDowall et al. | |
| 6,128,778 A | 10/2000 | Castagneri | |
| 6,249,277 B1 | 6/2001 | Varveris | |
| 6,338,162 B1 | 1/2002 | Geng | |
| 6,374,417 B1 | 4/2002 | Stagnitta | |
| 6,401,252 B1 | 6/2002 | Dean | |
| 6,408,441 B1 | 6/2002 | Smith et al. | |
| D468,870 S | 1/2003 | Bufford | |
| 6,527,464 B2 | 3/2003 | Lee | |
| 6,533,480 B2 | 3/2003 | Schneider | |
| 6,549,391 B1 | 4/2003 | Bisson | |
| 6,618,236 B1 | 9/2003 | Tsuwako et al. | |
| 6,626,598 B2 | 9/2003 | Schneider | |
| 6,669,657 B1 | 12/2003 | Ongwela | |
| D488,588 S | 4/2004 | Murphy | |
| 6,809,462 B2 | 10/2004 | Pelrine et al. | |
| 6,904,614 B2 | 6/2005 | Yamazaki et al. | |
| 7,022,917 B2 | 4/2006 | Jung et al. | |
| 7,100,212 B2 | 9/2006 | Jaeger | |
| 7,103,918 B2* | 9/2006 | Isom et al. | 2/159 |
| 7,103,919 B2* | 9/2006 | Isom et al. | 2/160 |
| 7,159,246 B2 | 1/2007 | Tippey | |
| 7,202,443 B2* | 4/2007 | Rock et al. | 219/211 |
| 7,218,313 B2 | 5/2007 | Marcus et al. | |
| 7,250,935 B2 | 7/2007 | Kubota et al. | |
| 7,268,320 B2* | 9/2007 | Rock et al. | 219/211 |
| 7,335,395 B2* | 2/2008 | Ward et al. | 427/198 |
| 7,335,528 B2* | 2/2008 | Rueckes et al. | 438/99 |
| 7,356,852 B2 | 4/2008 | Thai | |
| 7,365,031 B2 | 4/2008 | Swallow et al. | |
| 7,559,768 B2 | 7/2009 | Marmaropoulos et al. | |
| 7,721,353 B2* | 5/2010 | Saturnio | 2/160 |
| 7,842,879 B1 | 11/2010 | Carter | |
| 7,849,521 B1 | 12/2010 | Cromwell | |
| 7,874,021 B2 | 1/2011 | Sunder et al. | |
| 7,884,797 B1 | 2/2011 | Ning | |
| 2002/0017567 A1* | 2/2002 | Connolly et al. | 235/472.02 |
| 2002/0030094 A1* | 3/2002 | Curry et al. | 235/375 |
| 2002/0117493 A1* | 8/2002 | Rock et al. | 219/545 |
| 2002/0134828 A1* | 9/2002 | Sandbach et al. | 235/60.12 |
| 2002/0162732 A1* | 11/2002 | Sandbach et al. | 200/512 |
| 2002/0163495 A1 | 11/2002 | Doynov | |
| 2002/0178830 A1* | 12/2002 | Kazerooni et al. | 73/760 |
| 2003/0057408 A1* | 3/2003 | Kazerooni et al. | 254/270 |
| 2003/0178413 A1* | 9/2003 | Rock et al. | 219/545 |
| 2003/0186608 A1* | 10/2003 | Goldberg | 442/304 |
| 2003/0224685 A1* | 12/2003 | Sharma | 442/304 |
| 2004/0045955 A1* | 3/2004 | Rock et al. | 219/529 |
| 2004/0046734 A1 | 3/2004 | Hart | |
| 2004/0064870 A1 | 4/2004 | Gold | |
| 2004/0118166 A1* | 6/2004 | Huang et al. | 66/202 |
| 2004/0164968 A1* | 8/2004 | Miyamoto | 345/173 |
| 2004/0199232 A1* | 10/2004 | Wallace et al. | 607/115 |
| 2004/0225052 A1* | 11/2004 | Bialke et al. | 524/501 |
| 2004/0239578 A1* | 12/2004 | Aisenbrey | 343/872 |
| 2004/0255361 A1* | 12/2004 | Senter et al. | 2/160 |
| 2004/0264851 A1* | 12/2004 | Amiri | 385/31 |
| 2005/0095938 A1* | 5/2005 | Rosenberger et al. | 442/194 |
| 2005/0127057 A1* | 6/2005 | Rock et al. | 219/211 |
| 2005/0151722 A1 | 7/2005 | Meteyer | |
| 2005/0210652 A1 | 9/2005 | Epstein | |
| 2005/0223469 A1 | 10/2005 | Banton | |
| 2005/0231471 A1* | 10/2005 | Mallard et al. | 345/156 |
| 2006/0221066 A1 | 10/2006 | Cascella | |
| 2006/0226184 A1 | 10/2006 | Karzmer | |
| 2007/0178716 A1 | 8/2007 | Glaser et al. | |
| 2007/0245454 A1 | 10/2007 | Eklund | |
| 2008/0010718 A1 | 1/2008 | Richards | |
| 2008/0084390 A1 | 4/2008 | Jones | |
| 2008/0282446 A1* | 11/2008 | Komlos | 2/167 |
| 2009/0066658 A1 | 3/2009 | Earl | |
| 2009/0153369 A1 | 6/2009 | Baier et al. | |
| 2009/0156309 A1 | 6/2009 | Weston et al. | |
| 2009/0183297 A1* | 7/2009 | Drosihn | 2/167 |
| 2009/0312826 A1 | 12/2009 | Penny et al. | |
| 2009/0322685 A1 | 12/2009 | Lee | |
| 2010/0039392 A1 | 2/2010 | Pratt et al. | |
| 2010/0058513 A1* | 3/2010 | Drosihn et al. | 2/162 |
| 2010/0090966 A1 | 4/2010 | Gregorio | |
| 2010/0225590 A1 | 9/2010 | Pereira | |
| 2010/0231505 A1 | 9/2010 | Iwata | |
| 2010/0242153 A1 | 9/2010 | Harrison | |
| 2011/0016609 A1 | 1/2011 | Phelps et al. | |

FOREIGN PATENT DOCUMENTS

| | | |
|---|---|---|
| DE | 29709211 U1 | 11/1997 |
| EP | 1387242 A2 | 2/2004 |
| EP | 1769325 B1 | 4/2007 |
| FR | 2789274 A1 | 8/2000 |
| FR | 2849754 A1 | 7/2004 |
| FR | 2864803 A1 | 8/2005 |
| GB | 2284341 A | 6/1995 |
| GB | 2339495 A | 1/2000 |
| GB | 2438471 A | 11/2007 |
| JP | 58-192924 | 12/1983 |
| JP | 59-144604 A | 8/1984 |
| JP | 59-165412 | 11/1984 |
| JP | 64-14120 U | 1/1989 |
| JP | 4-56706 | 5/1992 |
| JP | 4163303 A | 6/1992 |
| JP | 3022639 | 1/1996 |
| JP | 10-66467 A | 3/1998 |
| JP | 2001115319 A | 4/2001 |
| JP | 2002285409 A | 10/2002 |
| JP | 2002309420 A | 10/2002 |
| JP | 2006-63456 | 3/2006 |
| JP | 2006058973 | 3/2006 |
| JP | 2008081896 A | 4/2008 |
| JP | 2009102779 A | 5/2009 |
| KR | 10-2005-0123052 A | 12/2005 |
| WO | 9007734 A1 | 7/1990 |
| WO | 2007/138292 A2 | 12/2007 |
| WO | 2010130632 A2 | 11/2010 |

OTHER PUBLICATIONS iTWYF product brochure from www.itwyf.com (6 pages).
"TAVO gloves for the iPod"—www.engadget.com/2006/01/04/tavo-gloves-for-the-ipod/—6 pages, Jan. 4, 2006.
"iGlove Cold Weather iPod Gloves"—i.gizmodo.com/237279/iglove-cold-weather-ipod-gloves—2 pages, Feb. 16, 2007.

(56) References Cited

OTHER PUBLICATIONS

"iTWYF Gloves Lets You Play With Your Gadgets in the Cold"—gizmodo.com/gadgets/gadgets/itwyf-gloves-lets-you-play-with-your-gadgets-in-the-cold-223678.php—2 pages, Dec. 21, 2006.
"The. iPhone Glove"—www.dotsglove.com—2 pages (c) 2008.
"Keeping Your Hands Warm and Texting, Too"—online.wsj.com/article/SB123198733366084499.html—2 pages, Jan. 14, 2009.
"Marmot Men's iGlove Multi (Fall 2007)"—www.moosejaw.com/moosejaw/product.asp?path=Search&path=marmot+mens+glo . . .—2 pages, (c) 1995-2007.
"freehands keep in touch"—shop.freehands.com—3 pages (c) 2009.
"North Face Etip gloves for touch screens"—www.gizmag.com/etip-gloves-for-touch-screens-from-north-face/13687/—3 pages, Jan. 6, 2010.
"Tavo Gloves let you use iPod in cold weather"—www.ilounge.com/index.php/news/comments/tavo-gloves-let-you-use-ipod-in-cold . . .—5 pages, Jan. 4, 2006.
"iGlove Multi"—marmot.com/catalog/fall_2007/10/20/50/node/769—2 pages, Fall 2007.
"iGlove Liner"—marmot.com/catalog/fall_2007/10/20/47/node/775/details—2 pages, Fall 2007.
"echo touch gloves"—www.echodesign.com/Category/features/Echo+Touch/default.aspx?rid=56—1 page, (c) 2010.
"Yay! Spend loads less on hottest holiday gifts"—today.msnbc.msn.com/id/34366887/—5 pages, Dec. 14, 2009.
"echo touch glove"—www.echodesign.com/Product/echo+touch+gloves/default.aspx?rid=4853&cr—2 pages, (c) 2010.
TouchTec web pages—touchtec.net—3 pages (c) 2010.
"TouchTec iPhone Gloves for Women, They're Finally Here!"—www.chipchick.com/2009/10/iphone-gloves.html—8 pages, Oct. 16, 2009.

* cited by examiner

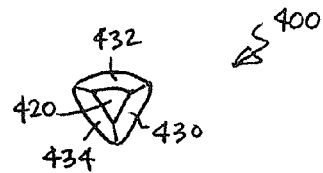
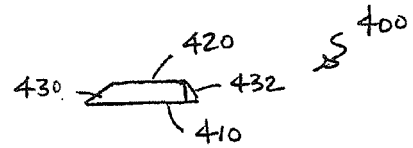
FIG. 10          FIG. 11
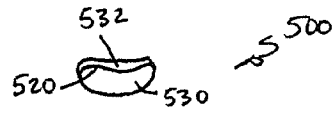
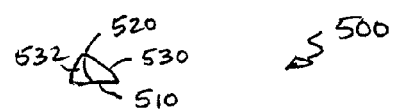
FIG. 12          FIG. 13
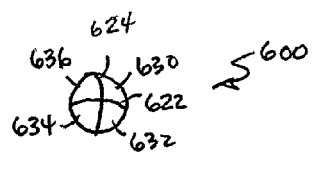
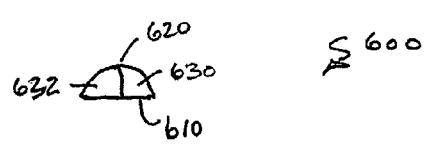
FIG. 14          FIG. 15
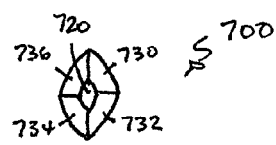
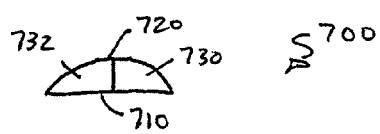
FIG. 16          FIG. 17

HAND COVERING WITH TACTILITY FEATURES

REFERENCE TO RELATED APPLICATION

This application claims priority to and the benefit of U.S. Provisional Patent Application No. 61/012,442, filed Dec. 9, 2007, the entire disclosure of which is incorporated herein by reference in its entirety.

BACKGROUND OF THE INVENTION

A hand covering with tactility features enable enables the wearer of the hand covering to have improved dexterity and tactility while wearing the hand covering and performing various tasks. In one embodiment, the hand covering includes a flexible conductive member that can be used with an interface of an electronic device.

There are many types of electronic devices that are used for various reasons, including but not limited to, communications, entertainment, work, and maintaining information such as contacts and appointments. Many electronic devices are continuously decreasing in size while increasing in functionality. Several types of electronic devices are portable, such as phones, pagers, communicators, electronic organizers, personal digital assistants, and digital audio and/or video playing devices such as iPods® or MP3 players.

The particular controls and methods of input for different electronic devices can vary. Some devices may include mechanical buttons or switches that can be activated by a user contacting the button or switch. Often, conventional hand coverings do not enable a user to accurately select and press a small mechanical button or switch.

Other electronic devices utilize a touch-sensitive technology for the interaction between the user and the device. One example of a touch sensitive technology is a touch screen which is an interactive screen that can be contacted by a user. Another example of a touch-sensitive technology is a track pad. The touch-sensitive technologies or applications sense and track a user's touch and its subsequent movement.

Some applications are resistive-type systems that include a resistive layer of material and a conductive layer of material that are disposed proximate to each other and separated by a narrow space of air. When a user touches a resistive-type screen or pad, the two layers contact each other in that exact spot, thereby changing the electric field and the particular spot can be identified. Thus, a resistive-type system registers a touch or input as long as the two layers make contact. The contact can be made using any type of object.

Other applications are capacitive-type systems that include a conductive layer of material that stores an electrical charge. When a user touches a capacitive-type screen or pad, a portion of the charge is transferred between the user and the screen or pad. As a result, the charge on the capacitive layer changes. Once this change occurs, the particular location of the change can be determined by a controller. A capacitive system needs a conductive input to register a touch or input. Such a conductive input can be made using a user's finger.

In an electronic device with a capacitive-type touch-sensing interface, a controller supplies electrical current to metal channels or conductors that form a grid and conduct electricity. When another conductor, such as a user's finger, is moved close to the grid, current wants to flow to the finger to complete a circuit. Typically, the electronic device includes a non-conductive item, such as a non-conductive piece of plastic, in the way. Thus, a charge builds up at a point on the grid that is the closest to the finger. The build up of electrical charge between two conductors is called capacitance. The controller of the electronic device measures any changes in capacitance and a signal is generated and sent to the microprocessor of the electronic device.

As electronic devices become smaller, the available space for input or control structures on the electronic devices decreases as well. Resistive-type and capacitive-type touch-sensing technologies are utilized on electronic devices. These touch-sensing technologies use capacitive and resistive buttons which can replace the small mechanical button and switch input devices. As mentioned above, capacitive touch-sensing requires a conductive input to register a touch by a user. While a conductive input can be accomplished through the touch of a user's finger, such a conductive input is difficult when a user is wearing a hand covering. Hand coverings such as gloves and mittens are worn for protection from cold weather or other environmental conditions. There is a decrease in tactile sensitivity when a user is wearing a conventional hand covering. In addition, conventional hand coverings do not allow a user to provide a necessary conductive input to an electronic device. Accordingly, to operate and utilize many electronic devices, a user must remove one or more digits from a hand covering.

SUMMARY OF THE INVENTION

A hand covering according to the present invention includes several finger receptacles and a thumb receptacle. The hand covering also includes at least one tactility component coupled thereto. In one embodiment, the tactility component can be coupled to one of the finger receptacles, such as the finger receptacle intended for use with an index finger. In another embodiment, the tactility component can be coupled to the thumb receptacle. In another embodiment, tactility components can be coupled to a finger receptacle and to the thumb receptacle.

Additionally, a hand covering according to the present invention can include a region of improved dexterity in the hand covering. The region of improved dexterity can be the result of a portion of the hand covering having a reduced thickness. In one embodiment, a finger receptacle of the hand covering can have a reduced thickness. In that implementation, the thickness of the material defining the finger receptacle can be less than the thickness of the material defining the rest of the shell of the hand covering. In another embodiment, a thumb receptacle of the hand covering can have a reduced thickness due to a thinner material defining the thumb receptacle than the remainder of the hand covering.

In one embodiment, a hand covering according to the present invention can include a thinner region defining a finger receptacle and/or a thumb receptacle and one or more tactility components coupled to a finger receptacle and/or a thumb receptacle, respectively. Different sizes and configurations of tactility components can be used.

In one embodiment, a hand covering can include one or more materials that facilitate a conductive input to an electronic device. The material or materials eliminate the need for a user to remove the hand covering for such an input.

BRIEF DESCRIPTION OF THE DRAWINGS

FIGS. 10 and 11 are top and side views, respectively, of an alternative embodiment of a tactility component according to the present invention.

FIGS. 12 and 13 are top and side views, respectively, of an alternative embodiment of a tactility component according to the present invention.

FIGS. 14 and 15 are top and side views, respectively, of an alternative embodiment of a tactility component according to the present invention.

FIGS. 16 and 17 are top and side views, respectively, of an alternative embodiment of a tactility component according to the present invention.

DETAILED DESCRIPTION

A hand covering according to the present invention includes several finger receptacles and a thumb receptacle. In one embodiment, the hand covering includes a tactility component coupled thereto. In another embodiment, a portion of the hand covering can have a reduced thickness as compared to other parts of the hand covering. The term "hand covering" is used to include any type of covering that can be worn on a person's hand, such as a glove or a mitten.

Figure 1:
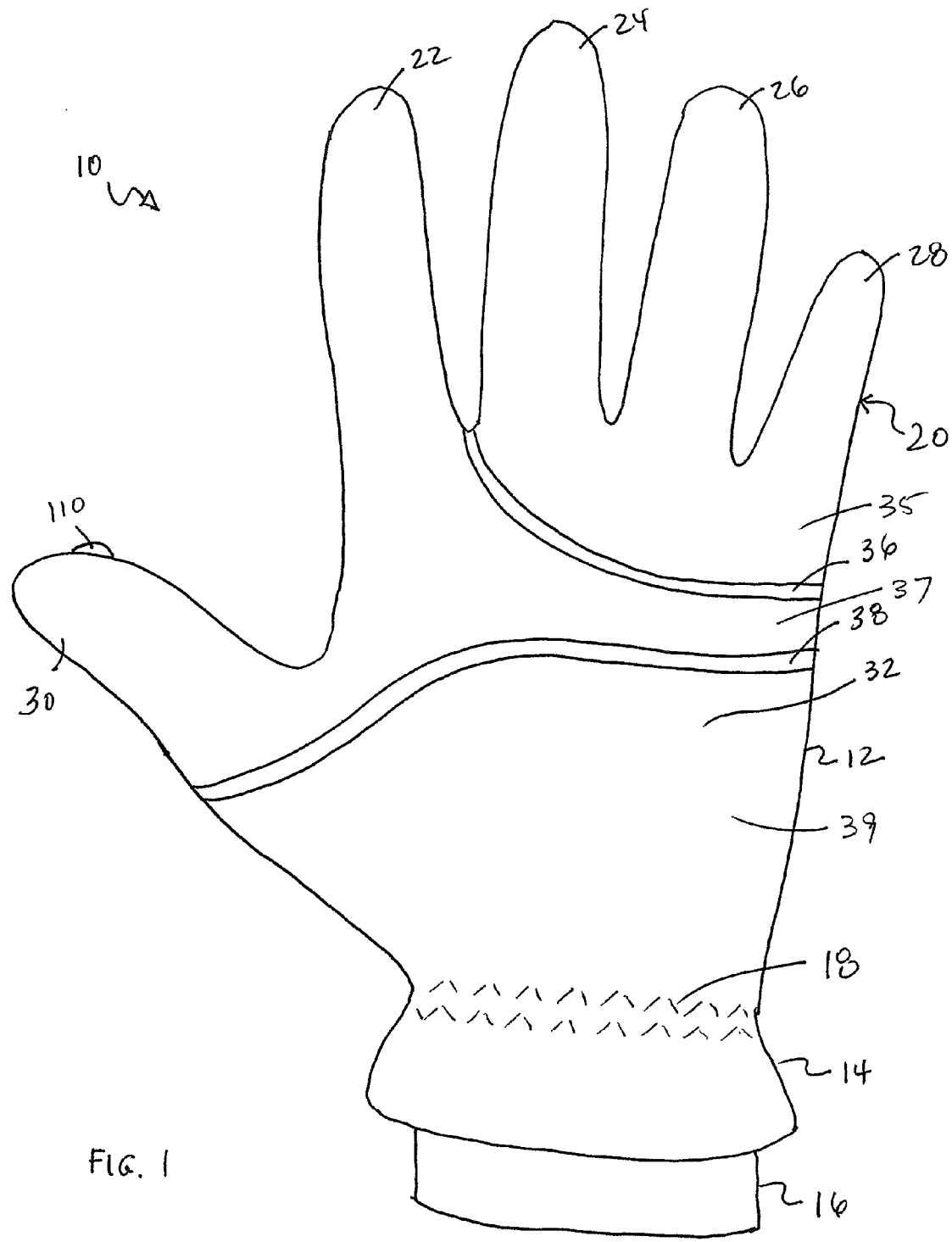
FIG. 1 is a top view of an embodiment of a hand covering according to the present invention.
Figure 2:
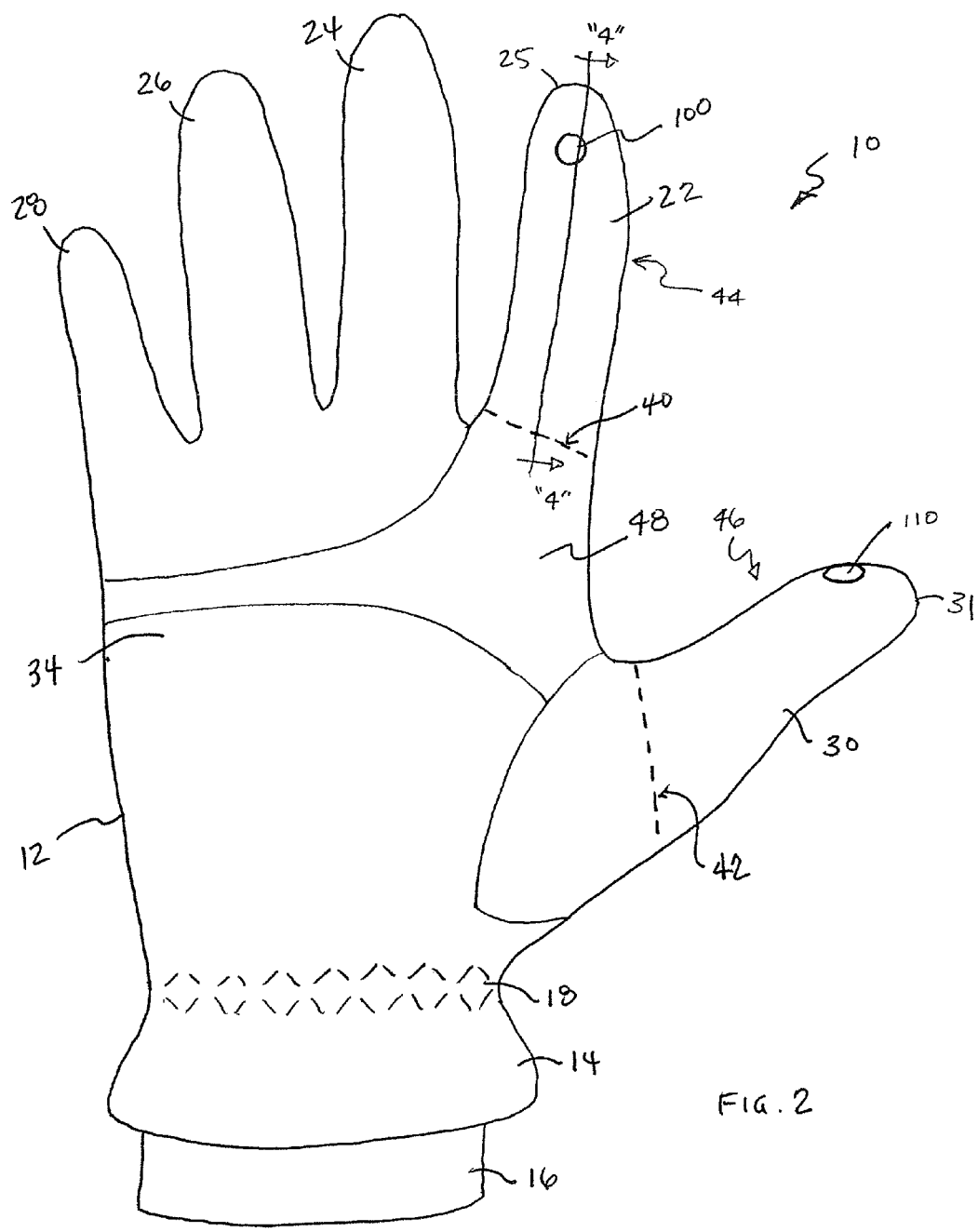
FIG. 2 is a bottom view of the hand covering illustrated in FIG. 1.

An embodiment of a hand covering according to the present invention is illustrated in FIGS. 1 and 2. The hand covering 10 includes a shell or shell assembly that has a palm portion or region 12, a cuff portion or region or skirt 14, and a finger region 20. The hand covering 10 also includes a fleece inner cuff 16 that is coupled to the shell by stitching 18, which forms part of an elastic wrist portion. Cuff 16 and cuff skirt 14 collectively provide protection against external elements entering into the interior of the hand covering 10. The finger region 20 has several finger receptacles 22, 24, 26, and 28, and a thumb receptacle 30. The shell includes a back side 32 (see FIG. 1) and a palm side 34 (see FIG. 2). In this embodiment, the material used for hand covering 10 is a tight fitting material with some stretching functionality and characteristics that allow for improved dexterity.

In one embodiment, the hand covering 10 may have certain colors or stylized features. As shown in FIG. 1, rubber molded articles 36 and 38 can be included as part of the shell to create a desired appearance. The rubber molded articles 36 and 38 can be used to define different portions of the shell of the hand covering 10. In particular, articles 36 and 38 can create or define sections 35, 37, and 39 that can be formed of different materials. For example, one or more of the sections 35, 37, and 39 can be formed of an elastic type, stretch material. The wearer can feel or sense the different zones of materials of the hand covering 10.

As illustrated in FIGS. 1 and 2, the hand covering 10 includes tactility components 100 and 110. Tactility components 100 and 110 are coupled to the hand covering 10 and are disposed in locations where the user or wearer of the glove typically engages an object. For example, a person wearing a hand covering performs actions, such as pressing buttons, most often with his or her index finger and/or thumb. Tactility components 100 and 110 can be referred to as buttons or projections and can be molded articles made of rubber or plastic. Alternatively, tactility buttons 100 and 110 can be silicon gel articles molded into a particular shape or configuration. Depending on the material, the tactility components can be coupled or adhered to the hand covering using an adhesive, by bonding, or other types of connecting or coupled techniques. The tactility components 100 and 110 are configured to facilitate the application of a concentrated force from a finger contained in the finger receptacle or thumb receptacle to an object.

In this embodiment, tactility component 100 is coupled to the palm side of finger receptacle 22, which corresponds to the index finger of a user. Tactility component 100 is coupled to the finger receptacle 22 close to the distal tip 25 of the finger receptacle 22, in which case, the component 100 would be closer to the tip of the index finger as opposed to the flat portion of the index finger. Tactility component 110 is coupled to the thumb receptacle 30 and in particular, to the inside surface or edge of the thumb receptacle 30 (noting that tactility component 110 can be seen in the back side view illustrated in FIG. 1). As a wearer of the hand covering 10 brings the wearer's index finger and thumb toward each other, the tip of the index finger and an inside surface or edge of the thumb contact usually each other first. Accordingly, the locations of the tactility components 100 and 110 on finger receptacle 22 and thumb receptacle 30, respectively, are selected based on the typically contacts of the index finger and thumb with an object. Thus, in this embodiment, tactility component 110 is not located on the main flat portion of the thumb receptacle 30, but is offset to the inner side or edge. In alternative embodiments, the locations of the tactility components on the finger receptacle and the thumb receptacle can vary.

Figure 3A:
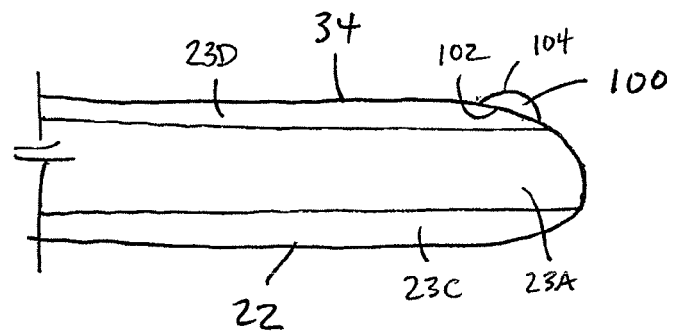
FIG. 3A is a side view of a portion of a finger receptacle of the hand covering illustrated in FIG. 1.

Referring to FIG. 3A, a side view of a portion of finger receptacle 22 is illustrated. As shown, finger receptacle 22 includes a palm side 34 to which tactility component 100 is coupled. In this embodiment, tactility component 100 is a molded article that has a rounded or curved configuration. Tactility component 100 has a bottom surface 102 and a rounded upper or contact surface 104. The contact surface 104 provides a small, targeted surface area that the wearer of the hand covering 10 can use to contact or press a button or other small object. The contact surface 104 results in a targeted area of pressure and force exerted by the wearer's finger.

Figure 3B:
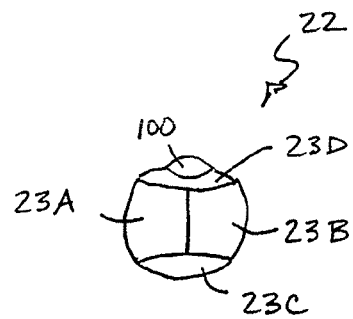
FIG. 3B is an end view of the portion of the finger receptacle illustrated in FIG. 3A.

Referring to FIG. 3B, an end view of a portion of finger receptacle 22 is illustrated. As shown, finger receptacle 22 has a "box like" construction with sections 23A, 23B, 23C, and 23D coupled together at seams. Some of the sections form gussets that allow for a tighter feel of the finger receptacle 22. In different embodiments, additional finger receptacles can be constructed in a manner similar to finger receptacle 22.

As shown in FIG. 2, hand covering 10 includes two tactility areas or regions 44 and 46 that are defined in part by transition areas 40 and 42, respectively. In this embodiment, finger receptacle 22 includes tactility region 44 that is defined by transition area 40 and the tip 25 of the finger receptacle 22. Similarly, thumb receptacle 30 includes tactility region 46 that is defined by transition area 42 and the distal tip 31 of the thumb receptacle 30. The tactility areas 44 and 46 can also be referred to as shell portions.

Each tactility region is defined by the particular region having a reduced thickness of material as compared to the rest of the hand covering 10, which can be referred to as the body 48. Transition area 40 defines where the thickness of the body or palm portion 12 changes to a thinner cross-section in the tactility region 44 of finger receptacle 22. Similarly, transition area 42 defines where the thinner cross-sectional material in the tactility region 46 of thumb receptacle 30 begins. In this embodiment, the other finger receptacles 24, 26, and 28 have the same thickness as the body 48 or palm portion of the hand covering 10. In one embodiment, the thickness of the material in region 44 may be the same as the thickness of the material in region 46, and both thicknesses are less than the thickness of the material in the body 48 of the hand covering 10. In another embodiment, the thickness of the material in region 46 can be different than the thickness of the material in region 44, and both of those thicknesses being smaller than the thickness of the body 48.

Figure 4:
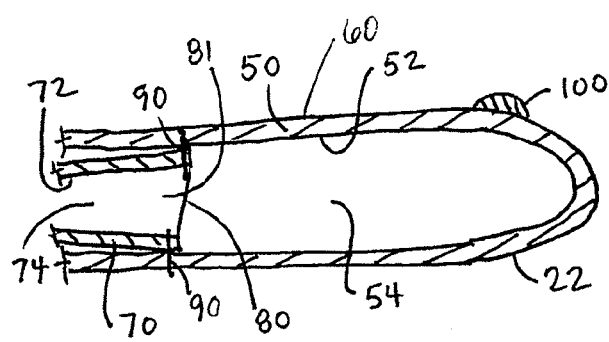
FIG. 4 is a cross-sectional side view of a portion of a finger receptacle of the hand covering illustrated in FIG. 2, taken along the line "4"-"4."
Figure 5:
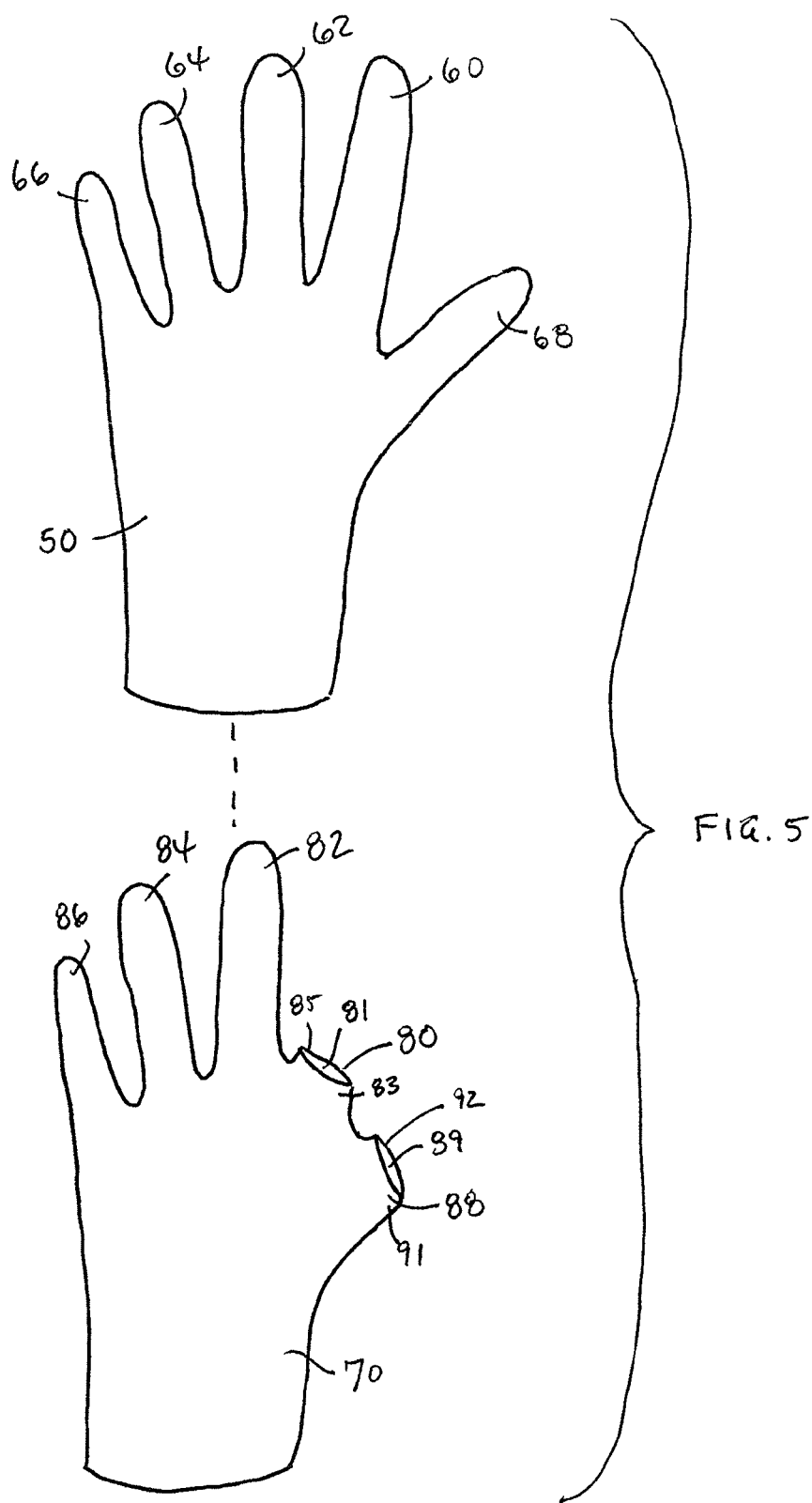
FIG. 5 is an exploded view of an outer shell and an inner shell of an embodiment of a hand covering according to the present invention.

Several of the components of an embodiment of a hand covering 10 according to the present invention are illustrated in FIGS. 4 and 5. Referring to FIG. 5, the hand covering 10 includes an outer or exterior shell 50 and an inner shell or liner 70. The outer shell or shell portion 50 includes finger receptacles 60, 62, 64, and 66, and a thumb receptacle 68. The inner shell or shell portion 70 includes finger receptacles 80, 82, 84, and 86, and a thumb receptacle 88. The outer shell 50 is slightly larger than inner shell 70 and is configured to receive the inner shell 70 therein. Each of the finger receptacles and thumb receptacle of the inner shell 70 is inserted into a corresponding finger receptacle or the thumb receptacle of the outer shell 50. In one embodiment, the inner shell 70 is a fleece liner.

As illustrated, finger receptacle 80, intended for a wearer's index finger, is cut or truncated close to the base 83 of the finger receptacle 80. The end 85 of finger receptacle 80 defines an opening 81, through which an index finger can extend. After it has been cut or terminated, the end 85 of finger receptacle 80 is finished to prevent unraveling or separation of the end 85. Similarly, thumb receptacle 88 is terminated close to the base 91 of the thumb receptacle 88. The end 92 of thumb receptacle 88 defines an opening 89, through which a thumb can extend. After it has been cut, the end 92 of finger receptacle 88 is finished to prevent unraveling or separation of the end 92.

Referring to FIG. 4, a cross-sectional view of a portion of finger receptacle 22 is illustrated. The view shown in FIG. 4 is taken along the line "4"-"4" in FIG. 2. The internal portion of finger receptacle 22 is shown. The outer shell 50 includes an inner surface 52 that defines an interior region 54 of the finger receptacle 22. In this embodiment, the outer shell 50 has a constant material thickness. The thickness of tactility region or shell portion 44 is defined by the thickness of the outer shell 50. The inner shell 70 includes an inner surface 72 that defines an interior region 74 of the finger receptacle 80 of the inner shell 70.

In this embodiment, the receptacle 80 of the inner shell 70 is coupled to the outer shell 50 by stitching 90 which extends around the circumference of the end 85 and opening 81 of receptacle 80. In other embodiments, the stitching can be separate spaced apart stitches or tackings. Alternatively, the end 85 of receptacle 80 can be coupled or bonded to the inner surface 52 using an adhesive material.

The location at which the end of the inner shell receptacle 80 is coupled to or fastened down to the outer shell receptacle 60 defines the location of transition area or region 40. The end 85 forms a stepped configuration at the transition area 40. In various embodiments, the length of inner shell receptacle 80 can vary, which will result in different lengths of the tactility region 44.

While only the tactility region 44 of finger receptacle 22 is described above in detail, the tactility region 46 of the thumb receptacle 30, as defined by receptacles 68 and 88 of the outer shell 50 and inner shell 70, respectively, is constructed in a similar manner. For example, the end 92 of inner shell receptacle 88 is coupled to thumb receptacle 68 using stitching or an adhesive proximate to opening 89. In this embodiment, the thickness of tactility region or shell portion 46 is defined by the thickness of receptacle 68 of the outer shell 50.

As previously described, the difference in thickness of the material creating the tactility regions 44 and 46 is achieved through the use of two shells or shell portions 50 and 70 and only having one of the shells with material in the tactility regions 44 and 46. In other embodiments, the material thickness difference can be achieved in a different manner as described below.

Figure 6:
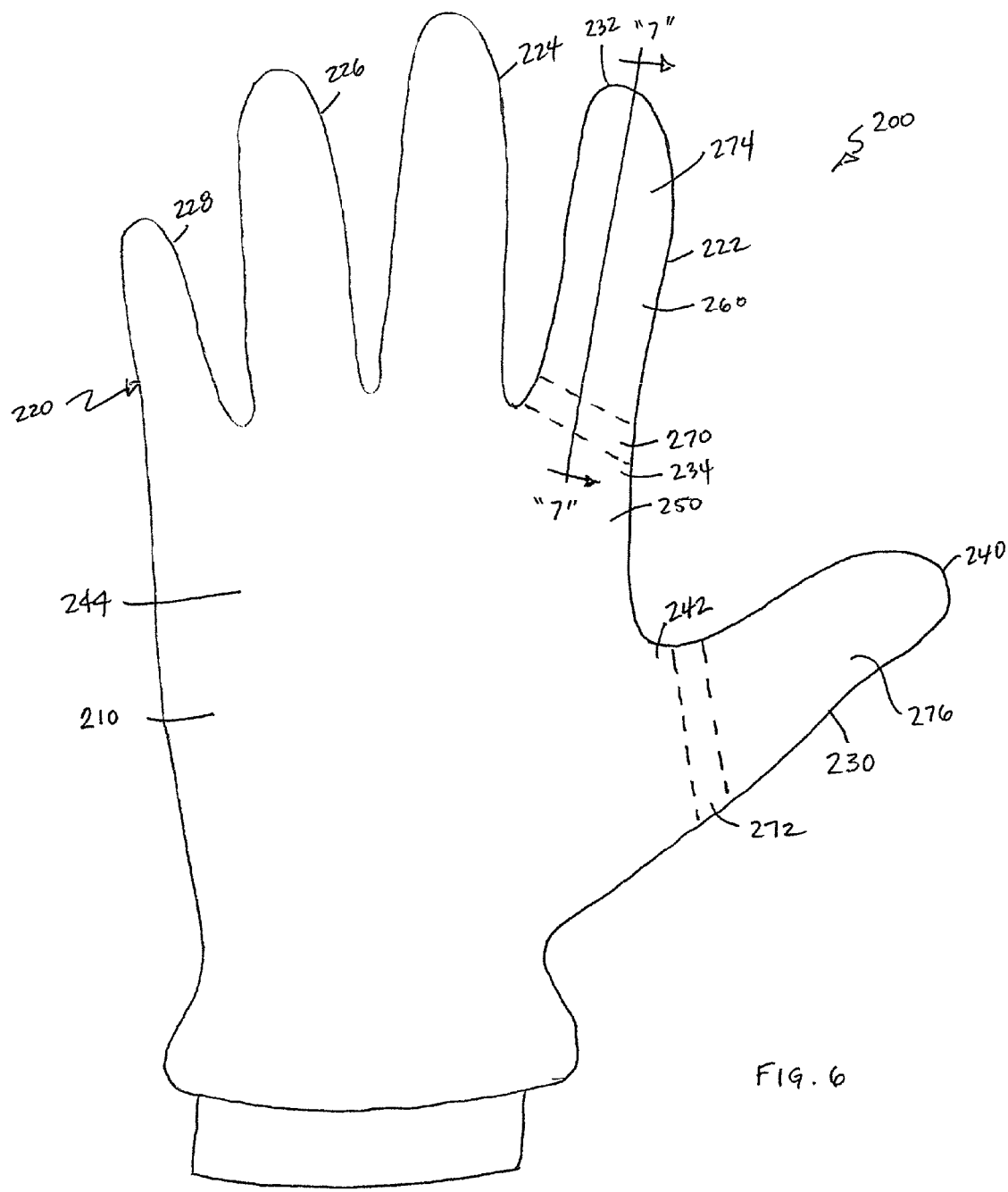
FIG. 6 is a bottom view of an alternative embodiment of a hand covering according to the present invention
Figure 7:
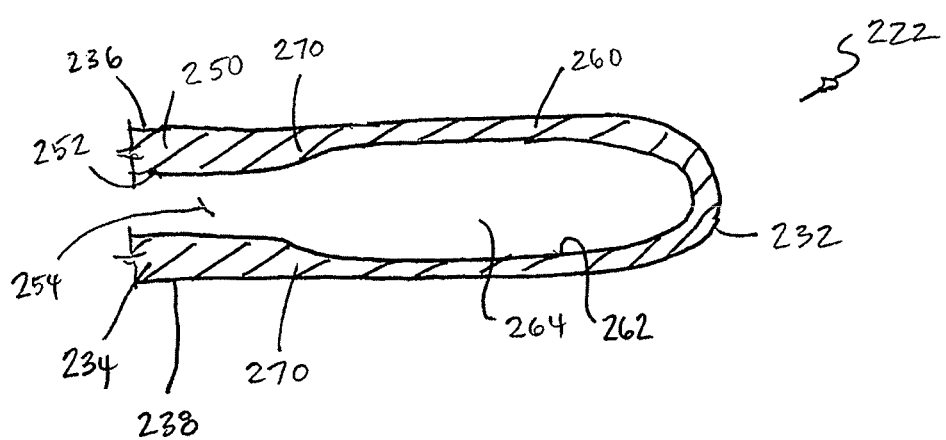
FIG. 7 is a cross-sectional side view of a portion of a finger receptacle of the hand covering illustrated in FIG. 6, taken along the line "7"-"7".

An alternative embodiment of a hand covering according to the present invention is illustrated FIGS. 6 and 7. In this embodiment, hand covering 200 includes a palm region 210, a finger region 220 including finger receptacles 222, 224, 226, and 228, and a thumb receptacle 230. Finger receptacle 222 and thumb receptacle 230 include tactility regions 274 and 276, respectively. Tactility region 274 is defined by a transition area 270 at one end and by the distal tip 232 of the finger receptacle 222 at the other end. Similarly, tactility region 276 is defined by a transition area 272 at one end and by the distal tip 240 of the thumb receptacle 230 at the other end. While not illustrated in FIG. 6, hand covering 200 may include one or more tactility components attached thereto.

Referring to FIG. 7, a cross-sectional view of finger receptacle 222 is illustrated. As shown, the hand covering 200 includes a first shell portion 250 that has a thickness and a second shell portion 260 that has a thickness less than that of the first shell portion 250. The first shell portion 250 includes an inner surface 252 that defines an interior region 254. Similarly, the second shell portion 260 includes an inner surface 262 that defines an interior region 264. The outer dimensions of the first shell portion 250 and the second shell portion 260 are the same. Accordingly, the difference in material thickness results in the interior region 254 of the first shell portion 250 being narrower than the interior region 264 of the second shell portion 260. The tactility and dexterity of the index finger in finger receptacle 222 is improved due to less material in the second shell portion 260. In this embodiment, the different shell portions with different thicknesses defined by the finger receptacle 222 and the body 244 of the hand covering 200 are integrally formed. Similarly, the different shell portions with different thicknesses defined by the thumb receptacle 230 and the body 244 of the hand covering 200 are integrally formed.

As shown in FIG. 7, the change in material thickness occurs at a transition area 270. The length of the transition area 270 can vary. In other words, the transition from the first shell portion 250 to the second shell portion 260 can be gradual and relatively smooth. Alternatively, it can be an abrupt step configuration, similar to the transition areas illustrated and described above with respect to hand covering 10.

The finger receptacle 222 includes a palm side 236, a back side 238 and a base 234. Similarly, thumb receptacle 230 includes a palm side, a back side, and a base 242.

Figure 8:
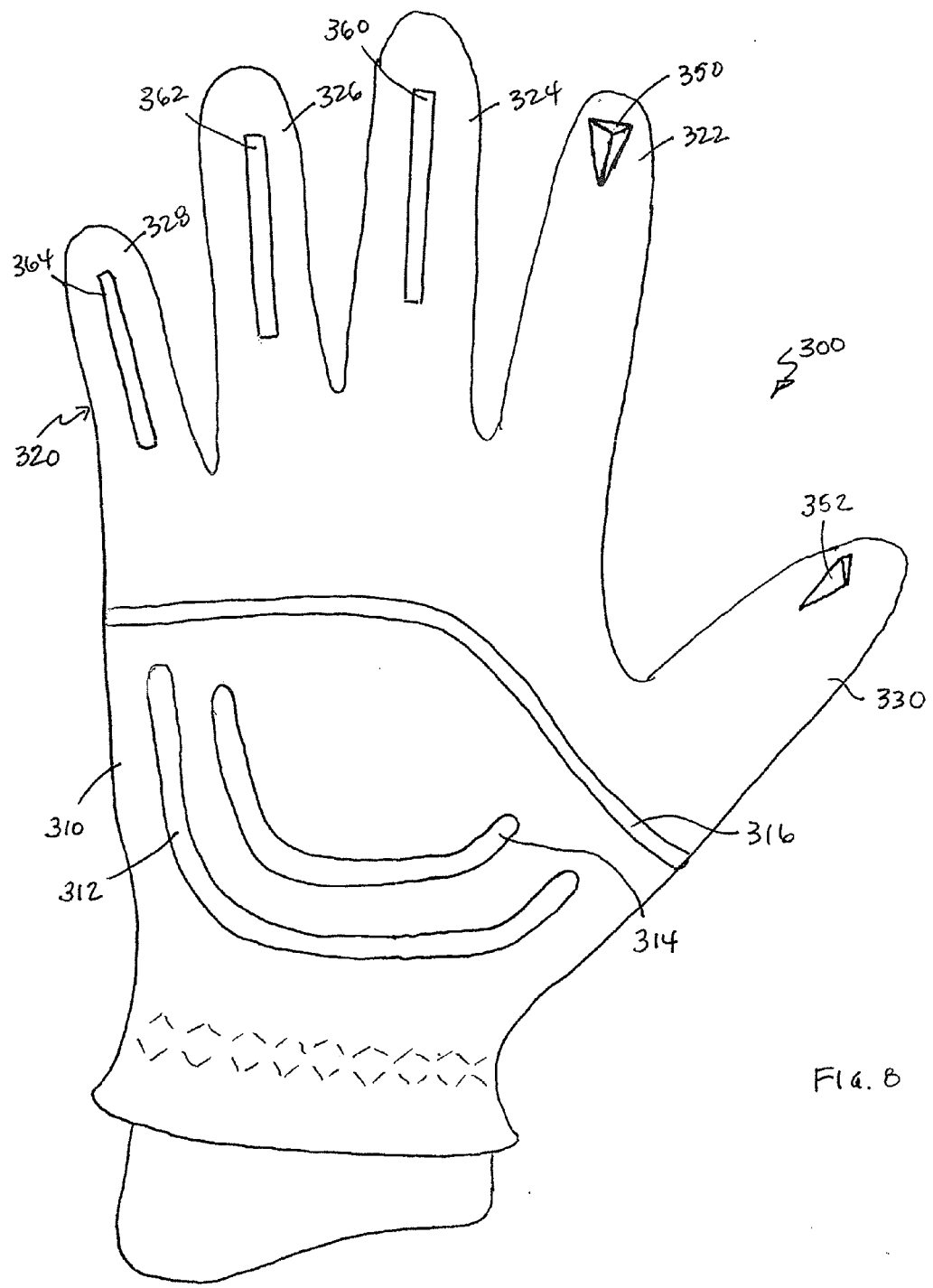
FIG. 8 is a bottom view of an alternative embodiment of a hand covering according to the present invention.

An alternative embodiment of a hand covering according to the present invention is illustrated in FIG. 8. In this embodiment, hand covering 300 includes a palm region 310, a finger region 320, and a thumb receptacle 330. The finger region 320 includes finger receptacles 322, 324, 326, and 328. Additionally, raised rubber molded articles 312, 314, and 316 can be coupled to palm region 310 to provide additional friction and gripping surfaces for the wearer of the hand covering 300. In an alternative embodiment, molded articles 312, 314, and 316 can be replaced by silicon gel prints that are coupled or adhered to the palm of the hand covering 300.

Hand covering 300 includes a tactility component 350 on finger receptacle 322 and a tactility component 352 on thumb receptacle 330. The shape and configuration of tactility components 350 and 352 are different than those of tactility components 100 and 110. Additional alternative embodiments of tactility components are illustrated in FIGS. 10-21 and described below.

Figure 9:
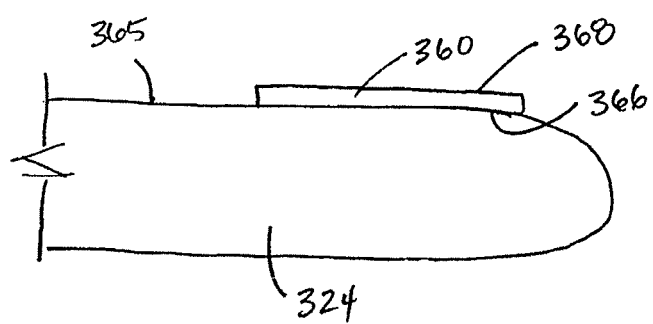
FIG. 9 is a side view of a portion of a finger receptacle of the hand covering illustrated in FIG. 8.

In this embodiment, hand covering 300 includes rectangular, elongate projections 360, 362, and 364 on finger receptacles 324, 326, and 328, respectively. The length of projections 360, 362, and 364 can vary. Referring to FIG. 9, a portion of finger receptacle 324 is illustrated. Projection 360 is coupled to the palm side 365 of the finger receptacle 324 and includes a bottom surface 366 and an upper or contact surface 368. In one embodiment, projections 360, 362, and 364 are raised rubber molded articles. In other embodiments, the projections can be formed of different materials.

An alternative embodiment of a tactility component according to the present invention is illustrated in FIGS. 10 and 11. As shown, the shape of tactility component 400 is triangular and it resembles a slice of a pyramid. Component 400 can be referred to as a rounded triangle. In this embodiment, the tactility component 400 includes a bottom surface 410 and a top surface 420. Top surface 420 is flat and has a triangular shape. Component 400 has three side surfaces 430, 432, and 434 that extend between the bottom surface 410 and the top surface 420. The flat configuration of top surface 420 provides the wearer with a surface area that can be used to apply a force or pressure to an object. The bottom surface 410 is configured to be coupled to a finger receptacle using an adhesive material or any other type of coupling or bonding techniques. Component 400 enables the wearer to hit or engage many angles and surfaces without aiming.

An alternative embodiment of a tactility component according to the present invention is illustrated in FIGS. 12 and 13. As shown, the overall shape of tactility component 500 is generally arcuate and it can be referred to as a curved fingertip shape. In this embodiment, the tactility component 500 includes a bottom surface 510 and two side surfaces 530 and 532 extending upwardly therefrom. The side surfaces 530 and 532 form a top edge 520 that is curved as illustrated in FIG. 12. Instead of a flat top surface as in component 400, the top edge 520 is a narrow, curved edge that provides a different point and type of engagement with an object. The configuration of component 500 wraps around a portion of the finger receptacle and enables the wearer to engage or hit an object from any direction.

An alternative embodiment of a tactility component according to the present invention is illustrated in FIGS. 14 and 15. As shown, the overall shape of tactility component 600 is a hemisphere and it resembles a raised, round dot. Tactility component 600 includes a bottom surface 610 and four side surfaces 630, 632, 634, and 636 that are defined by edges 622 and 624. The intersection point of edges 622 and 624 form top point 620, which provides a single point of contact and the concentration of force from the wearer.

Another embodiment of a tactility component according to the present invention is illustrated in FIGS. 16 and 17. The overall configuration of tactility component 700 resembles a diamond shape. Tactility component 700 includes a bottom surface 710, a top surface 720, and four side surfaces 730, 732, 734, and 736 extending between the bottom surface 710 and the top surface 720. The top surface 720 is similar to top surface 420 of tactility component 400 (see FIGS. 10 and 11) in that it defines a flat surface area for the wearer of the hand covering 700 to contact an object. Top surface 720 has a diamond-shaped configuration. Component 700 can be applied or coupled to a finger receptacle vertically or horizontally.

Figure 18:
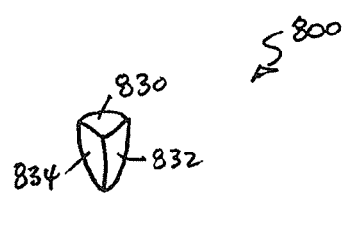
FIGS. 18 and 19 are top and side views, respectively, of an alternative embodiment of a tactility component according to the present invention.
Figure 19:
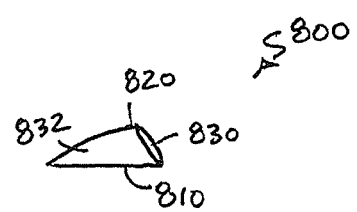

Another embodiment of a tactility component according to the present invention is illustrated in FIGS. 18 and 19. Tactility component 800 resembles a pyramid-like shape. Tactility component 800 includes a bottom surface 810 and three side surfaces 830, 832, and 834. The side surfaces 830, 832, and 834 collectively form a top point or tip 820. The tip 820 provides a single contact point that can be used to engage an object. Additionally, the side surfaces 830, 832, and 834 can accommodate all types of buttons.

Figure 20:
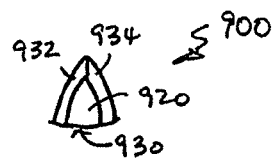
FIGS. 20 and 21 are top and side views, respectively, of an alternative embodiment of a tactility component according to the present invention.
Figure 21:
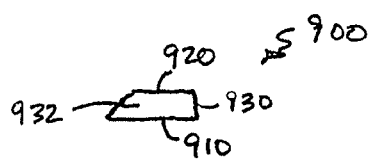

Another embodiment of a tactility component according to the present invention is illustrated in FIGS. 20 and 21. Tactility component 900 includes a bottom surface 910, a top surface 920, and three side surfaces 930, 932, and 934 that extend between the bottom surface 910 and the top surface 920. In this embodiment, side surfaces 932 and 934 are gradually sloped as they extend between the bottom surface 910 and the top surface 920. However, side surface 930 is substantially vertical, thereby allowing for the top surface 920 to have an increased surface area.

Figure 22:
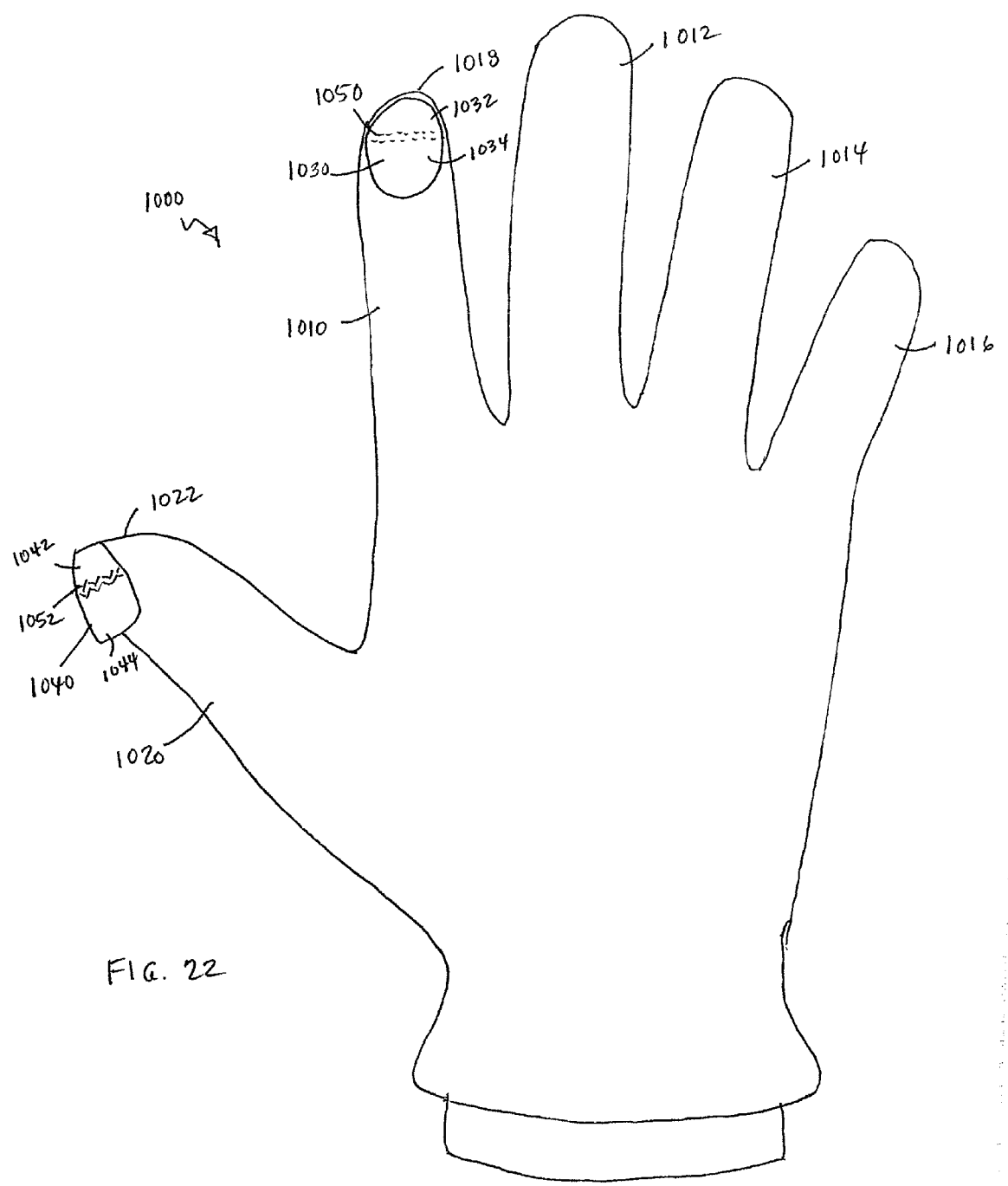
FIG. 22 is a bottom view of an alternative embodiment of a hand covering according to the present invention.

An alternative embodiment of a hand covering according to the present invention is illustrated in FIG. 22. In this embodiment, hand covering 1000 includes finger receptacles 1010, 1012, 1014, and 1016 and a thumb receptacle 1020. Finger receptacle 1010 includes a distal tip 1018 and thumb receptacle 1020 includes a distal tip 1022. Coupled proximate to distal tip 1018 on finger receptacle 1010 is a pull tab 1030. Pull tab 1030 is coupled by stitching 1050 that defines a fixed or coupled portion 1032 and a free portion 1034 that can be grasped by the wearer. Pull tab 1030 can be used to assist with the removal of finger receptacle 1010 from the corresponding finger of the wearer's hand. Similarly, coupled proximate to distal tip 1022 on thumb receptacle 1020 is a pull tab 1040. Pull tab 1040 is coupled by stitching 1052 that defines a fixed or coupled portion 1042 and a free portion 1044 that can be grasped by the wearer. Similar to pull tab 1030, pull tab 1040 can be used to assist with the removal of thumb receptacle 1020 and the hand covering 1000.

In other embodiments, pull tabs may be included on additional finger receptacles. Alternatively, pull tabs can be provided on any combination of the thumb receptacle and finger receptacles of a hand covering. The pull tabs can be utilized on a hand covering that includes one or more tactility components. Alternatively, the pull tabs can be utilized on a hand covering that includes one or tactility regions with a reduced thickness of the material in the region or regions.

In other embodiments, any combination of finger receptacles and a thumb receptacle of a hand covering may include tactility areas or regions. Similarly, any combination of finger receptacles and the thumb receptacle may include a tactility component either in addition to or in lieu of a tactility area or region.

In various embodiments, the size of the tactility components or projections can vary. In one embodiment, each tactility projection can have a width of 5 millimeters and a height of 1.5 millimeters. In other embodiments, the width and/or the height of the tactility projections can vary, depending on the desired shape and configuration.

In alternative embodiments, different materials can be included as part of or for an entire finger receptacle or thumb receptacle. Some materials that can be used include thin materials, conductive materials, hard plastics, molder rubber, and thermal plastic rubber materials.

Several additional embodiments of hand coverings are now discussed. In some of these embodiments, the hand coverings include a portion of conductive material. The conductive material is configured to transfer a charge from the hand covering and the user to an interface on an electronic device. Such hand coverings can be used with electronic devices with capacitive-type systems that require a conductive input to register a touch by a user.

Figure 23:
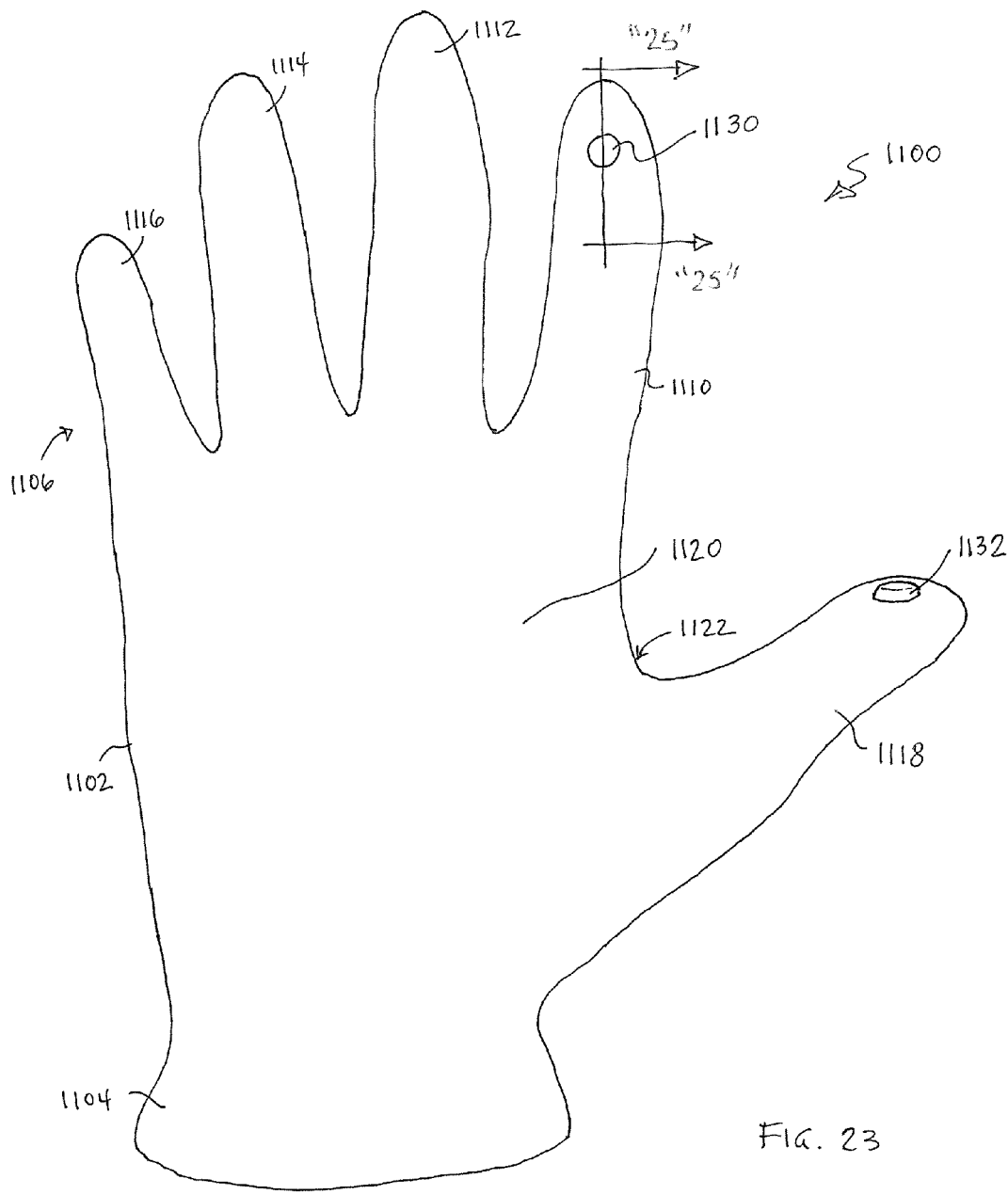
FIG. 23 is a front view of an alternative embodiment of a hand covering.

An embodiment of a hand covering is illustrated in FIG. 23. In this embodiment, the hand covering 1100 includes a shell with a palm section or portion 1102, a cuff portion 1104 and a finger region 1106. The shell includes a palm side 1120 proximate to the palm of a wearer's hand and a back side 1122 proximate to the back of a wearer's hand. The finger region 1106 includes several finger receptacles 1110, 1112, 1114, and 1116 and a thumb receptacle 1118.

Hand covering 1100 includes a projection 1130 that is associated with finger receptacle 1110. In this embodiment, the finger receptacle 1110 is engaged by the forefinger of the wearer of the hand covering 1100. As will be described below, the projection 1130 is configured to be used to interact with a control portion of an electronic device. In this embodiment, hand covering 1100 includes another projection 1132 on thumb receptacle 1118. Each of the projections 1130 and 1132 can include a portion of conductive material associated therewith so that a user can effectively contact a capacitive-type sensing system on an electronic device. Thus, when one of the projections 1130 and 1132 touches or is placed proximate to a conductive touch-sensing input, the conductive material effectively transfers a charge to the capacitive touch-sensing interface. The user can then move the finger or thumb associated with the projection 1130 or 1132 and provide the desired input to the device without removing any part of the hand covering.

Figure 24:
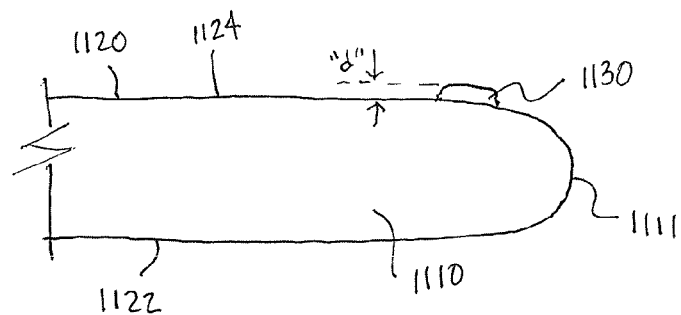
FIG. 24 is a side view of a finger receptacle of the hand covering illustrated in FIG. 23.

Referring to FIG. 24, a side view of finger receptacle 1110 is illustrated. The finger receptacle 1110 has a palm side 1120, a back side 1122, and a distal end 1111. As illustrated, the projection 1130 extends a distance "d" above the outer surface 1124 of the finger receptacle 1110. In various embodiments, the distance "d" can vary and be any amount, provided that the projection 1130 extends beyond the outer surface 1124 or profile of the finger receptacle 1110. The extension of the projection 1130 above the outer surface facilitates the engagement with an interface.

Figure 25:
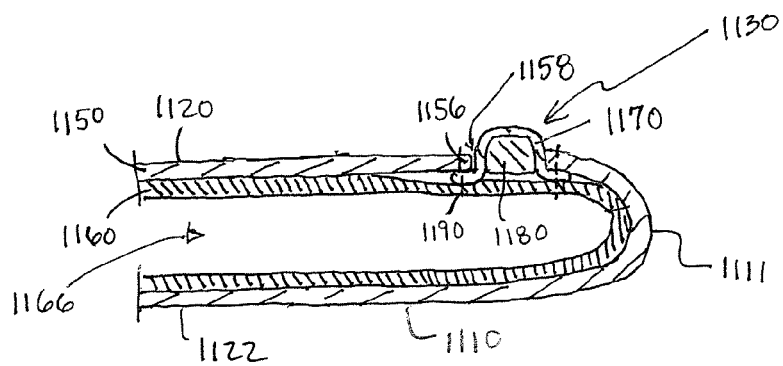
FIG. 25 is a cross-sectional side view of a finger receptacle of the hand covering illustrated in FIG. 23, taken along the line "23-23."
Figure 26:
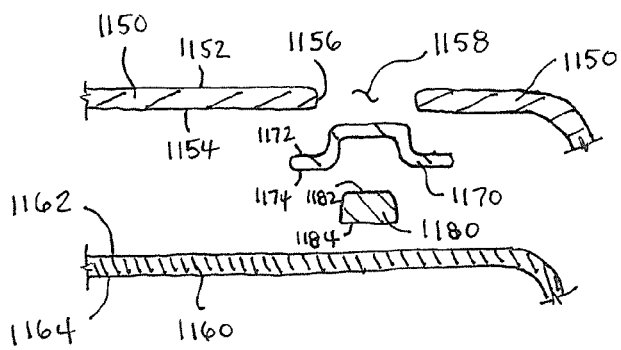
FIG. 26 is an exploded side view of some of the components of the finger receptacle illustrated in FIG. 25.

Referring to FIG. 25, a cross-sectional side view of the finger receptacle 1110 is illustrated. The cross-sectional side view in FIG. 25 is taken along the line "25-25" in FIG. 23. Referring to FIG. 26, portions of some of the components of the finger receptacle 1110 illustrated in FIG. 25 are shown in an exploded arrangement.

In FIG. 25, the components of the shell of this embodiment of the hand covering 1110 are illustrated. The finger receptacle 1110 includes an outer layer or portion 1150 that extends on the palm side 1120 and the back side 1122 of the finger receptacle 1110. In this embodiment, the outer layer 1150 is illustrated as being a single layer of material. However, in other embodiments, the outer layer 1150 on the palm side 1120 of the finger receptacle 1110 can be a different material than the outer layer 1150 on the back side 1122 of the finger receptacle 1110. For example, the outer layer 1150 on the palm side 1120 can be a polyurethane material that extends along the palm side 1120 of receptacle 1110 and wraps around the distal end 1111. The outer layer 1150 on the back side 1122 can be a nylon material that is coupled to the polyurethane material. In other embodiments, other materials, such as leather, wool, nylon, etc., can be used for the one or more pieces that comprise the outer layer 1150.

The outer layer 1150 includes an outer surface 1152 and an inner surface 1154. The outer layer 1150 includes an opening 1158 formed therethrough that is defined by an edge 1156. The opening 1158 can be formed in the outer layer 1150 in various ways and methods. For example, the opening 1158 can be die cut in the outer layer 1150 with a die or punch device. While the opening 1158 is illustrated as being substantially circular, in other embodiments, the opening 1158 can have another shape or configuration.

In this embodiment, the hand covering 1100 includes an inner layer 1160. The inner layer 1160 has an outer surface 1162 and an inner surface 1164 that defines an interior region 1166. In other embodiments, the hand covering 1100 may include one or more inner layers, such as a layer of insulation, in addition to inner layer 1160.

As shown in FIGS. 25 and 26, the hand covering 1100 includes a projection 1130. The projection 1130 includes a conductive member 1170. The conductive member 1170 can be referred to alternatively as an actuating member, actuator, conductive portion, or conductor.

In this embodiment, the conductive member 1170 is a layer of flexible conductive material. The conductive material is constructed so that it generates and/or maintains an electric charge, such as static electricity. When a user moves the conductive member 1170 in contact with or proximate to an electronic device with a capacitive-type interface, the conductive member 1170 transfers the required charge to the interface for an input. In one embodiment, the conductive member 1170 is formed of a conductive material, such as XT 15 material (having a material composition of 90% polyester and 10% carbon) that is available from Apex Mills. In other embodiments, the quantity of conductive fibers and/or the content of the conductive materials can vary. Alternatively, additional conductive material, such as additional carbon material or other conductive fiber material, can be added to conductive member 1170.

In this embodiment, the hand covering 1100 includes an insert or component 1180 that is used so that the conductive member 1170 extends outwardly from the outer surface 1124 of the finger receptacle 1100. In one embodiment, the insert 1180 is formed of a material that has no or minimal grounding properties and that does not absorb the static electricity or electrical charge present in conductive member 1170. For example, the insert 1180 can be formed of ethylene-vinyl acetate (EVA). In other embodiments, the insert 1180 can be made of a conductive material, such as metal or a molded article with conductive particles therein.

The size and configuration of the insert 1180 can vary in different embodiments of hand coverings. The insert 1180 can be cylindrical or substantially cylindrical with tapered sides. Alternatively, the insert 1180 can be hemispherical or have a rounded outer surface. Referring to FIGS. 25 and 26, the insert 1180 has an outer surface 1182 and an inner surface 1184. The shape or configuration of the outer surface 1182 determines the outer shape or profile of the projection 1130. As shown in FIG. 25, the insert 1180 is sized and configured so that it can extend through the opening 1158 formed in the outer layer 1150.

Figure 27:
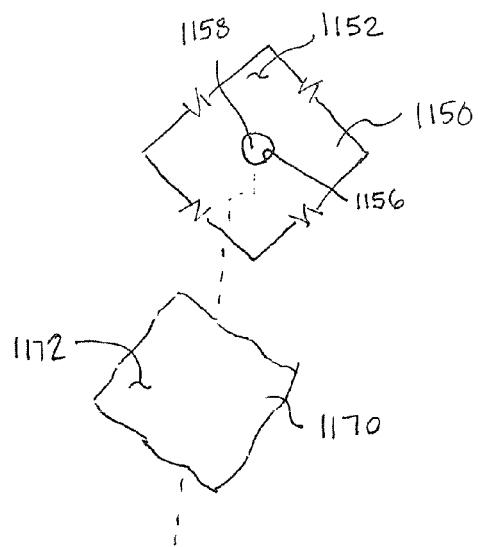
FIG. 27 is an exploded perspective view of the components of the finger receptacle illustrated in FIG. 26.

Referring to FIGS. 25-27, one method of assembly of the components of finger receptacle 1110 is discussed. For ease of reference, only portions of the outer layer 1150, the inner layer 1160, and the conductive member 1170 are illustrated in FIG. 27. The insert 1180 is positioned so that it engages the inner surface 1174 of the conductive member 1170. Since the conductive member 1170 is formed of a flexible fabric material, the conductive member 1170 can conform to the configuration of the insert 1180. The insert 1180 is moved into engagement with the opening 1158 so that a portion of the conductive member 1170 extends outwardly beyond the outer surface 1124 of the finger receptacle 1110.

The inner layer or liner 1160 is inserted into the interior region or receptacle defined by the outer layer 1150. The outer surface 1162 of layer 1160 is positioned proximate to the inner surface 1154 of the outer layer 1150 and the inner surface 1184 of the insert 1180. At this point, the outer layer 1150, the inner layer 1160, and the conductive member 1170 are coupled together. In one embodiment, layers 1150 and 1160 and conductive member 1170 are coupled together using stitching 1190. In other embodiments, different methods or techniques of coupling can be used to couple layers 1150 and 1160 and conductive member 1170. When they are coupled, the insert 1180 is retained in a particular position relative to the other parts of the finger receptacle 1110.

Figure 28:
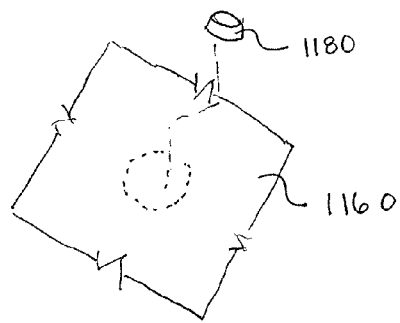
FIG. 28 is an exploded side view of some of the components of a finer receptacle of another embodiment of a hand covering.
Figure 28:
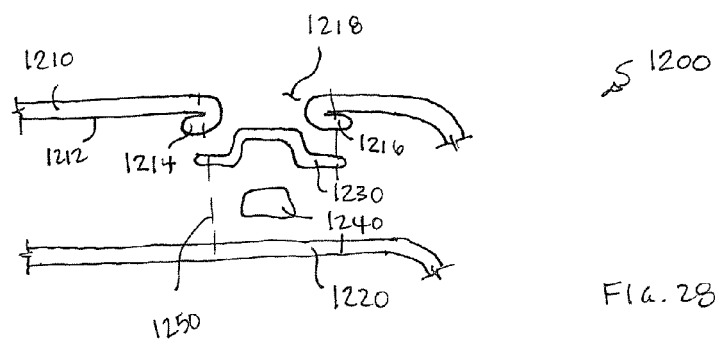
Figure 29:
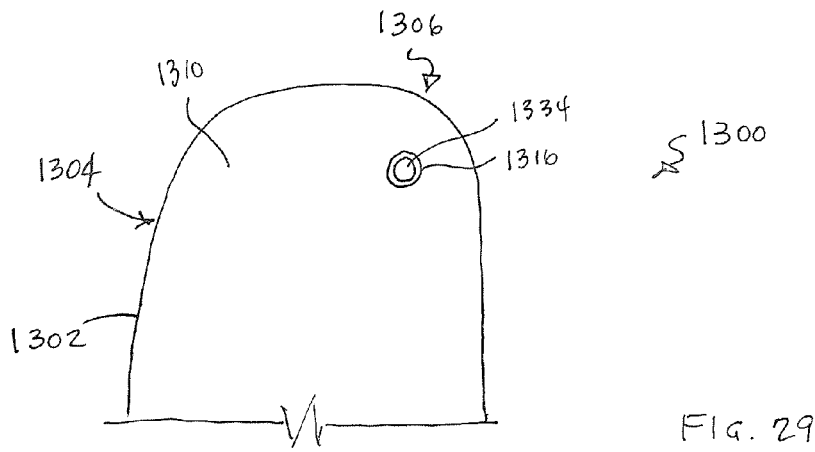
FIG. 29 is a front view illustrating a portion of an alternative embodiment of a hand covering.

An alternative embodiment of some components of a finger receptacle are illustrated in FIG. 28. In this embodiment, finger receptacle 1200 includes an outer layer 1210, an inner layer 1220, an conductive member 1230, and an insert 1240. As shown, the outer layer 1210 includes end portions 1212 and 1214 that are folded back and placed proximate to the inner surface 1212. The folded over end portions 1212 and 1214 define an opening 1218, which can be substantially circular or alternatively another shape. The end portions 1212 and 1214 can be coupled to the conductive member 1230 and inner layer 1220 with stitching 1250.

As described with respect to finger receptacle 1110, the outer layer 1150, the inner layer 1160, and the combination of the conductive member 1170 and insert 1180 form projection 1130. A similar combination of the outer layer 1150, the inner layer 1160, a conductive member and an insert can be used to form the projection 1132 on the thumb receptacle 1118.

While hand covering 1100 is illustrated as having multiple finger receptacles 1110, 1112, 1114, and 1116, the arrangement of the outer layer 1150, the inner layer 1160, the conductive member 1170, and the insert 1180 can be utilized in a hand covering that has a single finger receptacle, such as a mitten. The projection 1130 can be disposed at an appropriate location on the finger receptacle so that the wearer of the hand covering can utilize the projections 1130 and 1132 to contact an item or control a device.

An alternative embodiment of a hand covering is illustrated in FIGS. 29-32. In this embodiment, the hand covering 1300 includes a shell 1302 with a finger receptacle 1304 and a forefinger region or area 1306. The shell 1302 includes an outer layer 1310 that is formed of polyurethane. The outer layer 1310 has an outer surface 1312 and an opening 1316 that is defined by an edge 1314. The opening 1316 extends through the outer layer 1310.

Figure 30:
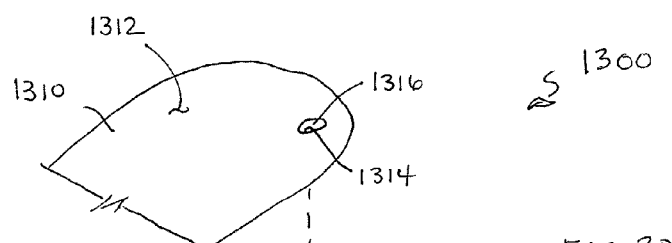
FIG. 30 is an exploded perspective view showing some of the components of the hand covering illustrated in FIG. 29.

Referring to FIG. 30, the hand covering 1300 includes an inner layer 1320 with an outer surface 1322. An insert 1330 is disposed between the outer layer 1310 and the inner layer 1320. The insert 1330 can be coupled to one or both of the outer layer 1310 and the inner layer 1320. For example, the insert 1330 can be sewn to, adhered to, and/or bonded to outer layer 1310 and/or inner layer 1320.

The insert 1330 includes a body 1332 and a projection 1334 that extends from the body 1332. While the body 1332 has a substantially circular perimeter and configuration, in other embodiments, the body can have different shapes or configurations.

Figure 31:
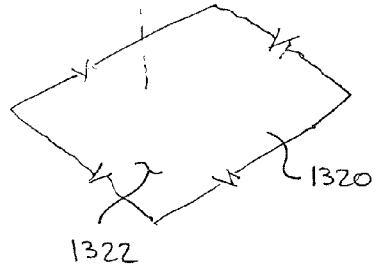
FIG. 31 is a side view of an embodiment of a contact member.
Figure 31:
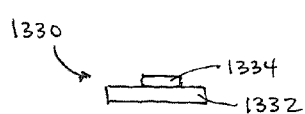
Figure 32:
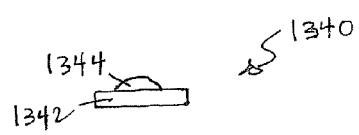
FIG. 32 is a side view of an alternative embodiment of a contact member.

Referring to FIGS. 31 and 32, different embodiments of inserts are illustrated. Insert 1330 includes a body 1332 and a projection 1334 that is substantially cylindrical. Insert 1340 includes a body 1342 and a projection 1344 that is rounded or substantially hemispherical. In one embodiment, the insert 1330 is a molded article with the body 1332 and projection 1334 integrally formed. For example, the insert 1330 can be formed of a polyurethane material. In another embodiment, the body 1332 and the projection 1334 can be formed separately and subsequently coupled together.

The projections 1334 and 1344 are configured so that the projection 1334 or 1344 can extend through the opening 1316 in the outer layer 1310. The height or distance that the projection 1334 or 1344 extends outwardly from the outer surface 1312 can vary. The extension of the projections enables the user to contact an item, such as a button or switch on an electronic device.

Figure 33:
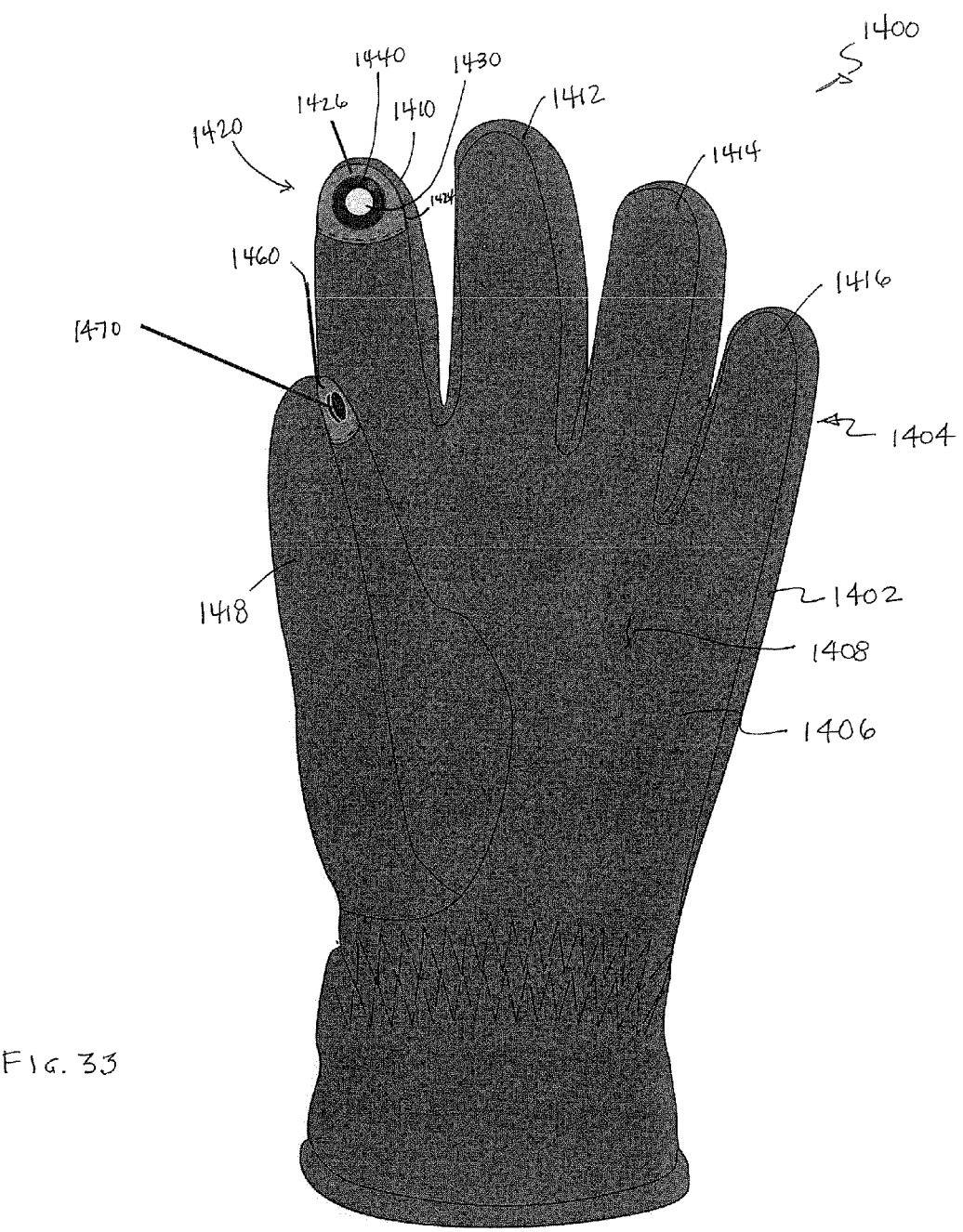
FIG. 33 is a front view of an alternative embodiment of a hand covering.
Figure 34:
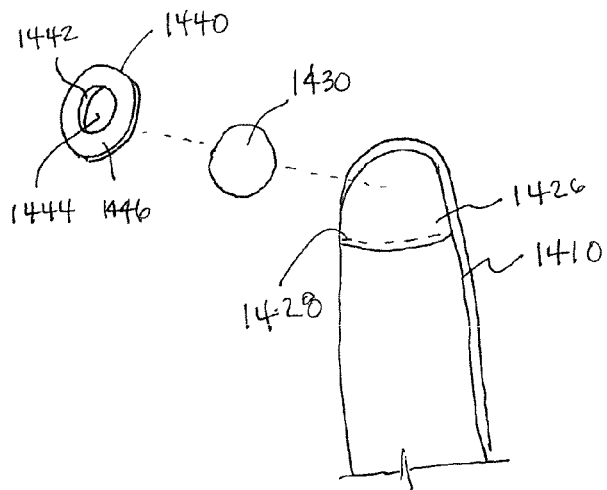
FIG. 34 is an exploded perspective view of some components of the hand covering illustrated in FIG. 33.

Referring to FIGS. 33 and 34, another embodiment of a hand covering is illustrated. In this embodiment, the hand covering 1400 is configured for use with a device that has a capacitive-type interface that requires a conductive input.

The hand covering 1400 includes a shell 1402 with a finger region 1404 and a palm region 1406. The palm region 1406 includes a palm side 1408 of the hand covering 1400 as shown in FIG. 33. The hand covering 1400 includes several finger receptacles 1410, 1412, 1414, and 1416 and a thumb receptacle 1418.

The hand covering 1400 includes a control portion or actuator portion 1420 that is formed on finger receptacle 1410. The actuator portion 1420 includes conductive material 1430 and a mounting structure 1440. The conductive material 1430 is a flexible fabric material, such as XT15 identified above, that can be used to generate and/or maintain an electrical charge and transfer it to an interface. The conductive material 1430 can be utilized with an electronic device or other object that requires a conductive input. The conductive material 1430 can be the same material as conductive member 1170 described above.

The conductive material 1430 is coupled to the finger receptacle 1410 by the mounting structure 1440. In this embodiment, the mounting structure 1440 is a molded rubber or polyurethane article that has a substantially circular configuration. As shown in FIG. 34, the mounting structure 1440 includes an inner edge 1442 defining an opening 1444 and an outer surface 1446. The mounting structure 1440 can be coupled to the finger receptacle 1410 in several different ways. For example, the mounting structure 1440 can be bonded to the finger receptacle 1410 using an adhesive or a heat treatment method. Alternatively, the mounting structure 1440 can be coupled to the finger receptacle 1410 using stitching.

In one embodiment, the finger receptacle 1410 can include a piece of material 1426 that is coupled along seam 1424 and stitching 1428 to the other components of the finger receptacle 1410. The material 1426 can be used to facilitate the coupling of the mounting structure 1440.

In this embodiment, the hand covering 1400 includes an engaging member 1470 that is coupled to the thumb receptacle 1418. The engaging member 1470 is a molded plastic or rubber article, such as a silicon gel, that is coupled to a piece of material 1460 on the thumb receptacle 1418. The engaging member 1470 is configured so that a user can utilize the user's thumb to contact an object, such as a mechanical switch or button.

Figure 35:
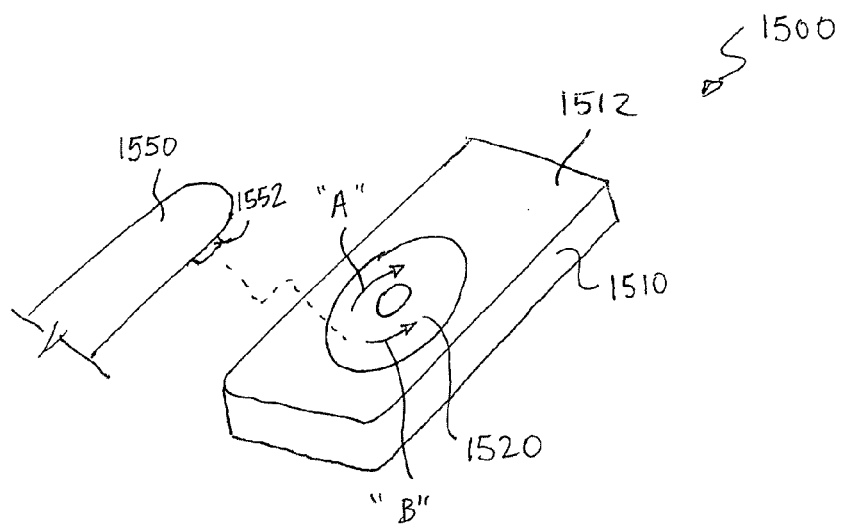
FIG. 35 is a perspective view of an exemplary electronic device and the hand covering illustrated in FIG. 23.
Figure 36:
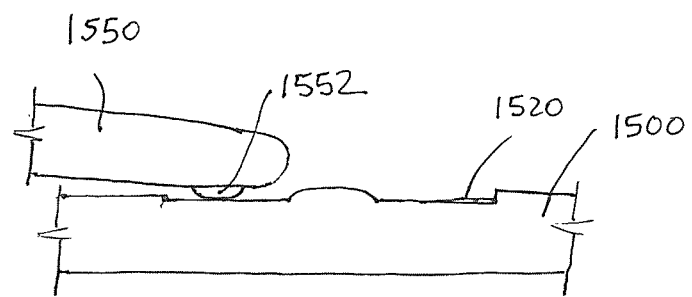
FIG. 36 is a side view of the interaction between the electronic device and the hand covering illustrated in FIG. 35.

Referring to FIGS. 35 and 36, an exemplary usage of a hand covering is illustrated. For ease of reference, only a finger receptacle 1550 of a hand covering is illustrated. It is to be understood that the shape or configuration of the finger receptacle can vary and that a thumb receptacle can be utilized as well.

Finger receptacle 1550 includes a conductive portion or member 1552. Conductive portion 1552 can be similar to projection 1130 of hand covering 1100 which included conductive member 1170 and insert 1180. Alternatively, conductive portion 1552 can be similar to conductive member 1430 of hand covering 1400.

In FIG. 35, an exemplary electronic device 1500 is illustrated. Electronic device 1500 includes a housing 1510 with a surface 1512 that can include a display or display screen. The housing 1510 includes a control portion 1520 which, in this embodiment, is controlled or actuated by an electrical charge or static electricity.

The wearer of the hand covering can move the finger receptacle 1550 toward electronic device 1500 so that the conductive member 1552 is proximate to control portion 1520. In one embodiment, it is not necessary that conductive member 1552 contacts the control portion 1520. Provided that there is static electricity or an electrical charge present in conductive member 1552, the movement of member 1552 along the direction of arrow "A" or arrow "B" in FIG. 35 will generate inputs to the control portion 1520 and thereby serve as a user input to the electronic device 1500. Such an input may be to select one or more audio and/or video outputs, to change the characteristics of the audio and/or video outputs from the device 1500, and/or to interact with a program operating on the device 1500. Referring to FIG. 36, the conductive member 1552 is illustrated as being in contact with the control portion 1520 of the device 1500.

In various embodiments, the size, shape and configuration of each conductive material portion may vary depending on the size and type of interface on the electronic device with which the user will interact. Also, the locations of conductive material on hand coverings can vary and can be in addition to the forefinger and thumb areas on the hand coverings. In an alternative embodiment, a conductive sheath can be coupled to a finger receptacle on a hand covering.

While the invention has been described in detail and with references to specific embodiments thereof, it will be apparent to one skilled in the art that various changes and modifications can be made therein without departing from the spirit and scope thereof. Thus, it is intended that the present invention covers the modifications and variations of this invention.

What is claimed is:

1. A hand covering comprising:
   a shell including a palm region, a cuff region, and a finger region, the finger region including a finger receptacle, the shell including an outer layer, wherein the outer layer of the shell includes an opening formed in the finger receptacle;
   a conductive member, the conductive member being coupled to the finger receptacle, the conductive member including a layer of flexible conductive fabric material, the conductive member being configured to transfer a charge from a user wearing the hand covering to a capacitive-type touch sensing interface on an electronic device, the conductive member being configured to extend through the opening in the finger receptacle of the shell; and
   an insert, the insert being configured to extend through the opening in the finger receptacle of the shell, the insert engaging an inner surface of the layer of flexible conductive fabric material, and the layer of flexible conductive fabric material conforming to the configuration of an outer surface of the insert.

2. The hand covering of claim 1, wherein the insert is substantially cylindrical with tapered sides.

3. The hand covering of claim 1, wherein the shell includes an inner layer, and the layer of flexible conductive fabric material and the insert are disposed between the inner layer and the outer layer of the shell.

4. The hand covering of claim 1, wherein the layer of flexible conductive fabric material includes conductive fibers therein.

5. A hand covering, comprising:
   a shell, the shell including a finger receptacle, the finger receptacle having an opening formed therein;
   a conductive member, the conductive member being a flexible layer of fabric material; and
   an insert, the insert being disposed proximate to the conductive member, and the conductive member substantially conforming to the configuration of an outer surface of the insert, the insert and the conductive member extending through the opening in the finger receptacle, the conductive member being configured to transfer a charge from a user wearing the hand covering to a capacitive-type touch sensing interface on an electronic device.

6. The hand covering of claim 5, wherein the finger receptacle includes an outer layer and an inner layer, the outer layer includes the opening formed therein, and the insert and the conductive member extend through the opening in the outer layer.

7. The hand covering of claim 6, wherein the insert and the conductive member are disposed between the inner layer and the outer layer.

8. The hand covering of claim 6, wherein the conductive member is coupled to the inner layer and to the outer layer.

9. The hand covering of claim 8, wherein the conductive member, the inner layer and the outer layer are coupled together by stitching.

10. The hand covering of claim 5, wherein the conductive member includes conductive fibers therein.

11. A hand covering, comprising:

a shell, the shell including a finger region and a palm region, the finger region including a finger receptacle having an outer surface; and an actuator portion, the actuator portion being coupled to the shell, the actuator portion including a conductive material and a mounting structure, the conductive material including a flexible fabric material, the mounting structure being coupled to the outer surface of the finger receptacle and configured to couple the conductive material to the outer surface of the finger receptacle, the conductive material being configured to transfer a charge from a user wearing the hand covering to a capacitive-type touch sensing interface on an electronic device.

12. The hand covering of claim 11, wherein the mounting structure is a molded object that has a substantially circular configuration.

13. The hand covering of claim 12, wherein the mounting structure includes an inner edge that defines an opening.

14. The hand covering of claim 13, wherein the conductive material is disposed between the mounting structure and the shell, the conductive material being accessible through the opening in the mounting structure.

15. The hand covering of claim 14, wherein the mounting structure is bonded to the finger receptacle.

16. The hand covering of claim 11, wherein the mounting structure is coupled to the finger receptacle via stitching.

17. The hand covering of claim 11, wherein the conductive material includes conductive fibers therein.

18. The hand covering of claim 1, wherein the shell has an outer surface, and at least a portion of the flexible conductive fabric material and at least a portion of the insert extend beyond the outer surface of the shell.

19. The hand covering of claim 5, wherein the insert engages an inner surface of the flexible layer of fabric material.

20. The hand covering of claim 5, wherein the shell has an outer surface, and at least a portion of the flexible layer of fabric material and at least a portion of the insert extend beyond the outer surface of the shell.

* * * * *